2,975,149
NON-TERMINAL EPOXY RESINS

William S. Port, Norristown, Leonard L. Gelb, Philadelphia, and Waldo C. Ault, Glenside, Pa., assignors to the United States of America as represented by the Secretary of Agriculture No Drawing. Filed Mar. 2, 1959, Ser. No. 796,710
16 Claims. (Cl. 260—23)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to epoxy resins. More particularly, this invention relates to epoxy resins prepared by polymerization of cyclic anhydrides and compounds containing non-terminal epoxide groups.

Commercially available intermediates for thermosetting resins, useful in molding compositions for encapsulating delicate parts, making shaped objects, and the like, are predominantly glycidyl derivatives or contain terminal epoxide groups. Processes have been developed in which epoxy ether resins and compositions containing these resins are mixed with curing (hardening) agents and, usually with slight heating, allowed to stand until a hard, cured resin is produced. In contrast to the foregoing type of epoxy resin, compounds containing non-terminal epoxides, many of which have been known for many years, are little used because these compounds are less reactive and because the cured resins derived therefrom have low heat distortion temperatures, low tensile strengths, and low moduli of elasticity. As will be illustrated subsequently, the non-terminal epoxides and cyclic anhydrides of the compositions of the present invention upon heating for many hours, form only viscous liquids, gels, and soft, friable solids.

We have now discovered that the addition of small amounts, that is, about from 0.1 to 4%, by weight, of a tertiary amine, such as benzyl dimethyl amine, β-dimethylaminopropionitrile, and triamylamine, to mixtures of non-terminal epoxy compounds and cyclic anhydrides gave desirable products. These products range from soluble polymers, obtained when mono-functional epoxides and cyclic anhydrides were reacted to hard, clear, non-soluble resins obtained when multifunctional epoxides or anhydrides were used. The addition of the tertiary amine does not merely shorten the time required to obtain a resin, but produces a different kind of resin. For example, in place of a soft, friable, weak gel which was obtained in the absence of the tertiary amine, a hard, clear, glass-like resin was obtained when the same reactants were heated in the presence of the amine.

The linear polymers obtained by this process are useful as lubricant additives, thickening agents, or components of surface coatings. The insoluble resins are useful in making cast objects, molding compositions, and the like.

According to the present invention a new epoxy resin is prepared by a process comprising heating until cured, that is, until the polymerization reaction is substantially complete, a mixture of components which must be completely miscible at the temperature at which reaction is effected, said mixture of components containing an amount ranging from an equimolar equivalent to 20% greater or 20% less than an equimolar equivalent of a material having at least one non-terminal epoxide group, such as the epoxide groups in epoxidized vegetable oils, epoxidized animal fats, and in synthetic esters and amides, for example, epoxidized oleate and linoleate esters or amides, a cyclic anhydride such as a cyclic carboxylic anhydride, for example, phthalic anhydride, or a lactone, for example, β-propiolactone, and about from 0.1 to 4%, by weight, of a tertiary amine.

An object of the present invention is to prepare epoxy resins from esters and amides containing non-terminal epoxide groups.

Another object of this invention is to prepare improved resin products from epoxy derivatives of fats and oils.

Other objects and a fuller understanding of the invention may be had by further referral to description and claims.

Epoxidized vegetable oils may be prepared by well-known procedures from vegetable oils containing unsaturated fatty acids. Among important vegetable oils are soybean, cottonseed, linseed, perilla, and safflower oils.

Unsaturated fatty acids such as oleic, linoleic, and linolenic may be converted to esters using mono-, di-, and polyhydric alcohols and the resulting synthetic esters epoxidized to give a wide range of compounds containing non-terminal epoxide groups. Non-terminally unsaturated alcohols used in the preparation of esters increases the number of sites of epoxidation.

One of the advantages of employing non-terminal epoxy intermediates, especially those derived from unsaturated fatty acids, alcohols and amines is the relative simplicity of introducing chemical constituents which will have modifying effects on the properties of the final resins. Among the constituents which may be introduced into the precursors from which non-terminal epoxide monomers are prepared are phosphorus, sulfur, oxygen, nitrogen, halogens, silicon, and boron derivatives and carbocyclic and heterocyclic derivatives.

The general reaction of the present invention, that of a non-terminal epoxide and cyclic anhydride in the presence of a tertiary amine, is not restricted to cyclic carboxylic acid anhydrides such as phthalic anhydride, but is operative with other cyclic compounds capable of producing a propagating ion under suitable catalysis. We have used β-propiolactone in the preparation of the resin products. Other cyclic compounds which may be used are lactams, imides, sulfo-carboxylic acid anhydrides, N-carboxy anhydrides (from amino acids), cyclic diureides, hydantoins and the like.

In contrast to the formation of a hard resin from commercial (glycidyl) epoxy intermediates and phthalic anhydride in the absence of a tertiary amine, only weak friable gels or viscous liquids were obtained from non-terminal epoxides and phthalic anhydride in the absence of tertiary amine even after long heating (Examples 14 and 16). Optimal molar ratio of reactants, amount of initiator, reaction temperature and cure time were obtained by correlation with heat distortion temperature, modulus of elasticity and tensile strength. The data in Table I illustrates a preliminary study to decide upon molar ratio of reactants.

TABLE I

*Effect of variation of phthalic anhydride on the heat distortion temperature and modulus of elasticity of resins made from epoxidized soybean oil*

| Phthalic Anhydride, Mole Percent | Heat Distortion Temp., °C. | Modulus of Elasticity, Lbs./Sq. Inch×10⁻⁴ |
|---|---|---|
| +20 | 49 | 1.8 |
| +10 | 48.5 | 2.15 |
| Equivalent | 51 | 2.44 |
| −10 | 48 | 1.49 |
| −20 | 32 | 0.85 |

2.5% Benzyldimethylamine cured at 140° C. for 10 hours.

A 20% excess of phthalic anhydride or a 10% excess of expoxidized soybean oil did not cause appreciable change in heat distortion temperature of the resin products. The effect upon modulus of elasticity was proportionately greater. It appears that considerable leeway in formulation may be exercised and still obtain resins satisfactory for many purposes. As a result of these correlations, the typical conditions employed in making resins in the following examples will be equivalent weights of non-terminal expoxide and cyclic anhydride, that is, one mole anhydride to one epoxide equivalent, at 150° C. in the presence of 2.5% by weight tertiary amine, followed by curing for 10 hours at 150° C. Individual examples may vary from the general conditions, particularly in the time-temperature relationships. When lower temperatures are used the reaction time must be increased to achieve a resin with about the same physical characteristics. The proper curing temperature and time for the particular mixture to be reacted is readily determined by preliminary experimentation.

Although 2.5% (based on the weight of all reactants) of the tertiary amine was used to insure optimum reaction, the presence of only 0.1% tertiary amine illustrated its significance in the formation of resins and the preferred range from about 0.2 to 4% tertiary amine gave resins with heat distortion temperatures which were comparable with those from 2.5% tertiary amine.

Most of the non-terminal epoxides were prepared from carefully selected precursors. For instance, oleic acid means for mechanical agitation, a thermometer, and a dropping funnel were placed 220 ml. of chloroform and 110 g. (0.0602 mole) of dipentaerythritol hexalinoleate (iodine number 161.4). A solution of 200 g. (35.5%) peracetic acid (0.935 mole), 100 ml. glacial acetic acid and 10 g. sodium acetate was dropped into the flask within 1 hr. while the temperature was maintained at 20–25° C. After the peracetic acid solution had been added, the reaction mixture was agitated at 20–25° C. until there was essentially no change in the peracetic acid concentration of the reaction mixture (about 4 hours). The reaction mixture was then poured into 600 ml. of water. The chloroform layer was separated and freed from acids by successive washings with water, dilute sodium bicarbonate solution and water. The chloroform solution was dried over anhydrous calcium sulfate, filtered and the chloroform was distilled off at a low pressure.

Net weight of dodecaepoxide 99.8 g. (82% yield), of 89.7% purity based on 8.53% oxirane oxygen found (calculated 9.51%); true functionality of the epoxide, 10.76 (calc.).

Certain syntheic oleate and linoleate esters and natural glycerides were epoxidized in the same manner except that the equivalent amount of the requisite olefin was substituted for dipentaerythritol hexalinoleate. The resulting yields, oxirane oxygen values, purities and true functionalities for these epoxides are listed in Table II under the name of the corresponding unsaturated intermediate.

TABLE II

| Example No. | Unsaturated ester to be epoxidized | Data Pertaining to Epoxide Product ||||||
|---|---|---|---|---|---|---|---|
| | | M.P., °C. | Yield, Percent | Percent Oxirane [a] | | Purity, Percent | True Funct. | Epoxide Equivalent [b] |
| | | | | Found | Calc. | | | |
| | *Oleates* | | | | | | | |
| 1 | Glycol dioleate | 52–53 | 26.6 | 4.64 | 5.15 | 90.0 | 1.80 | 344 |
| 2 | Glycerol trioleate | | 91.4 | 4.84 | 5.15 | 94.0 | 2.82 | 330 |
| 3 | Pentaerythritol tetraoleate | | 94.0 | 4.98 | 5.10 | 97.7 | 3.91 | 321 |
| 4 | Dipentaerythritol hexaoleate | | 91.6 | 4.72 | 4.96 | 95.2 | 5.71 | 339 |
| | *Linoleates* | | | | | | | |
| 5 | Methyl linoleate | 31.5–32 | 45.6 | 9.30 | 9.82 | 94.8 | 1.90 | 172 |
| 6 | Glycol dilinoleate | 74–75 | 54.3 | 9.0 | 9.85 | 91.5 | 3.66 | 178 |
| 7 | Glycerol trilinoleate | 35–37 | 85.0 | 9.07 | 9.87 | 92.0 | 5.52 | 176 |
| 8 | Pentaerythritol tetralinoleate | | 81.2 | 8.66 | 9.70 | 89.4 | 7.15 | 185 |
| 9 | Dipentaerythritol hexalinoleate | | 82.0 | 8.53 | 9.51 | 89.7 | 10.76 | 188 |
| | *Natural Glycerides* | | | | | | | |
| 10 | Neatsfoot oil | | 97.3 | 4.06 | [c] 4.35 | 93.2 | | 394 |
| 11 | Lard oil | | 96.0 | 4.15 | [c] 4.46 | 93.0 | | 386 |
| 12 | Soybean oil [d] | | (d) | 5.91 | | | | 270 |
| 13 | Perilla oil | | 84.0 | 9.04 | 10.45 | 86.5 | | 177 |

[a] Method of Durbetaki, Anal. Chem. 28, 2000 (1956).
[b] 1600/% oxirane oxygen found.
[c] Based on iodine value of the unsaturate.
[d] Epoxidized product from commercial sources.

of low saturates content was prepared by distilling commercial oleic acid (iodine value 88). The fractions boiling in the range 173–190° C. at 0.06 mm. mercury pressure, $n_D^{30}$ 1.4565 to 1.4570, iodine value 29 (calc. 89.9), were used in making the esters. Linoleic acid, obtained from safflower seed oil, had an iodine value of 178 (calc. 181). Glyceryl esters were prepared substantially as described in Journal Biological Chem. 132, 687 (1940).

The following expoxidation is typical of procedures used in Examples 1 to 13, listed in Table II.

EXAMPLE 4

Dipentaerythritol hexalinoleate was expoxidized by a modification of the method of Findley, Swern and Scanlan [J. Am. Chem. Soc. 67, 412 (1945)]. Into a one liter, three neck, round bottom flask equipped with a Several examples are presented to illustrate the importance of the tertiary amine in initiating the reaction to produce the new epoxy resins.

EXAMPLE 14

A solution of epoxidized soybean oil (oxirane oxygen 5.91) 13.6 g. (0.05 equivalent) and 7.4 g. (0.05 mole) phthalic anhydride was heated at 160° C. Gelation occurred after about 1.5 hours and a rubbery product which was soft and friable resulted in two hours. After being heated for a total of six hours it was still soft and friable and when cooled was a white cloudy easily-broken mixture. Curing times up to 22 hours did not improve the physical properties of the product. The presence of many discrete crystals of phthalic anhydride at this time showed that very little or no reaction had occurred between the epoxy compound and the anhydride. A similar mixture of epoxidized soybean oil and phthalic anhydride containing in addition 1 g. of benzyldimethylamine was also heated at 160° C. Gelation occurred in less than 1 hour. At the end of 1¼ hours, a clear, hard, tough, glass-like polymer was obtained.

EXAMPLE 15

4.44 g. (.03 mole) of phthalic anhydride and 0.27 ml. of benzyldimethylamine were heated at 150° C. in an 11 mm. x 10" tube. To this was added 5.64 g. (.03 equivalent) of epoxidized dipentaerythritol hexalinoleate (cf. Table II) previously heated to 150° C. After being mixed, the material is gelled within 3 minutes. It was cured at 150° C. for 8 hours, yielding a very hard, rigid, transparent resin.

A similar mixture, but with the benzyldimethylamine omitted, gelled in 17 minutes and, under the same conditions of cure, gave a flexible, black opaque substance.

EXAMPLE 16

2.78 g. of hexachloroendotetrahydrophthalic anhydride and 1.11 g. phthalic anhydride (total of .015 mole anhydride) were melted at 150° C. in a small test tube. To the melt was added 5.79 g. (0.015 equivalent) epoxidized lard oil and 0.25 ml. of benzyldimethylamine. The mixture was stirred and heated at 150° C. for 2 hrs. after gelation (14 minutes), then at 120° C. for 24 hrs. The resulting resin was hard, transparent and flexible.

A similar mixture without the tertiary amine gelled in 1.5 hrs. and resulted in a soft, friable opaque material with discrete crystals of anhydride visible.

From the foregoing it is readily apparent that the presence of the tertiary amine makes possible a product which cannot be obtained by the alternative of prolonged curing in the absence of the tertiary amine.

The following examples illustrate typical preparations of epoxy resins from the non-terminal epoxides listed in Table II. Methyl oleate was found satisfactory as a mold release agent.

EXAMPLE 17

To a 9 mm. x 10" Pyrex tube, closed at one end, coated with a film of methyl oleate, was added 3.1 g. (.021 mole) of phthalic anhydride. The tube was heated at 150° C. until the anhydride was melted. 3.9 g. (0.021 equivalent) of the octa-epoxide of pentaerythritol tetralinoleate (Example 8) of Table II was weighed in a small test tube and heated at 150° C. for 5 minutes. The hot epoxide was poured into the molten anhydride and mixing was accomplished by inverting the tube. To this mixture was added 0.2 ml. of benzyldimethylamine. The tube was heated at 150° C. for 8 hrs. after gelation which took 4 minutes. The resulting resin was transparent, amber colored, glass-like and hard. Its physical properties were determined and are reported in Table III.

EXAMPLE 18

A 9 mm. x 10" Pyrex tube, closed at one end, coated with a film of methyl oleate, was filled with 2.66 g. (.018 mole) of phthalic anhydride and 5.76 g. (.018 equivalent) of the tetraepoxide of pentaerythritol tetraoleate (Example 3, Table II). The tube was immersed in a 150° C. oil bath until the contents were molten, and then the tube was inverted several times for mixing. To this was added 0.23 ml. of benzyldimethylamine, and mixing was again accomplished by inverting the tube. After gelation had occurred (24 minutes), the material was cured in an oven at 150° C. for 8 hours. The resulting resin, removed from the glass tube, was clear, amber colored, somewhat soft and flexible. Its physical properties, viz. heat distortion temperature, tensile strength, modulus of elasticity and percent elongation, were measured and are reported in Table III.

TABLE III

| Example No. | Prepared from Epoxide of Example No.— | Heat Distortion Temperature, °C. | Tensile Strength, lbs./sq. in. | Modulus [a] of Elasticity | Percent Elongation |
|---|---|---|---|---|---|
| 19 | 1 | −29 | 30 | 4.76 | 9.0 |
| 20 | 2 | −9.5 | 150 | 9.55 | 20.0 |
| 18 | 3 | 13 | 1,550 | 51.2 | 22.5 |
| 15 | 4 | 42 | 3,450 | 129 | 4.0 |
| 21 | 5 | 44 | 3,660 | 132 | 7.1 |
| 22 | 6 | 79 | 6,200 | 172 | 7.3 |
| 23 | 7 | 88 | 6,500 | 182 | 5.3 |
| 17 | 8 | 90.5 | 4,160 | 312 | 1.5 |
| 24 | 9 | 123 | 3,530 | 265 | 2.2 |
| 25 | 10 | −5.0 | 70 | 8.13 | 11.1 |
| 16 | 11 | −9.5 | 100 | 8.65 | 17.2 |
| 14 | 12 | 49 | 2,685 | 165 | 2.0 |
| 26 | 13 | 73 | | | |

[a] Lbs./sq. in.×10⁻³.

Other resins were prepared by substituting the equivalent weight of the requisite epoxides shown in Table III (Examples 19–26). Also given are the physical properties of the resulting resins.

The data of Table III shows that a wide range of physical properties are obtainable in the epoxy resins prepared from epoxy derivatives of natural glycerides and of synthetic esters containing unsaturated fatty acids, using the process of the present invention.

It has now been found that limiting values of certain physical properties which vary with functionality, as demonstrated in the oleate series, Examples 15, 18, 19 and 20, and the linoleate series, Examples 17, 21–24, can be markedly increased by adding an additional tie-point at each cross-link, although the longest distance between cross-links remains 22 to 25 carbon atoms. This is shown by comparing the corresponding members of each series, for instance, the product of Example 19 in which one of the reactants was epoxidized glycol oleate vs. the product of Example 22 in which the corresponding reactant was epoxidized glycol linoleate.

The process of the present invention is illustrated with another type of non-terminal epoxide.

EXAMPLE 27

A solution of 5.0 g. (0.051 mole) cyclohexene oxide (commercial), 7.4 g. (0.050 mole) phthalic anhydride and 0.6 ml. benzyldimethylamine were heated at 140° C. for 1.5 hours. A very rapid polymerization took place. The polymer was a hard, clear material soluble in benzene from which it could be precipitated with low-boiling petroleum ether.

The following examples are included to illustrate the preparation of epoxy resins from amides containing non-terminal epoxy groups. In order to obtain the epoxy-amides for these resin reactions it was necessary to first prepare the amides and then to epoxidize them.

EXAMPLE 28

*Preparation of N,N'-dioleoylethylenediamine.*—Methyl oleate (651 grams, 2.20 moles) was heated to 180° C. and was treated with 60 grams (1.00 mole) anhydrous ethylenediamine added slowly through a period of 1.5 hours. The reaction solution was kept at 100° C. for 3 hours after the completion of the addition. Methanol distilled out during the course of the reaction, a total of 97% of the theoretical amount being collected. When the reaction solution was cooled crude N-N'-dioleoylethylenediamine crystallized out. The crude product was recrystallized from ethanol to give a 52% yield of pure material M.P. 117–118° C., having an iodine number 85.9, 77.2% carbon, 12.5% hydrogen, 4.62% nitrogen (calculated values 86.5, 77.5%, 12.2% and 4.76% respectively).

EXAMPLE 29

*Preparation of N-N'-di-(cis-9,10-epoxystearoyl)ethylenediamine.*—Peracetic acid (0.048 mole as a commercial product which had been treated with sodium acetate to neutralize sulfuric acid present) was added (with mechanical agitation) to 11.8 g. (0.02 mole) of N,N'-dioleoylethylenediamine dissolved in 75 ml. chloroform. The temperature of the reaction mixture was maintained at 25–30° C. by controlling the rate of addition of the peracetic acid and by external cooling. Agitation was continued for three hours after the completion of the addition of the peracetic acid and then the reaction mixture was poured into crushed ice. The crude product which crystallized out was filtered off, washed with water until it was acid-free and was dried. When this product was recrystallized from carbon tetrachloride, N,N'-di(cis-9,10-epoxystearoyl)ethylenediamine M.P. 127–129° C., having an oxirane oxygen of 4.98 (calculated 5.16) was obtained in 48.5% yield.

EXAMPLE 30

*Curing of N,N'-di(cis-9,10-epoxystearoyl)ethylenediamine with phthalic anhydride.*—N,N'-di-(cis-9,10-epoxystearoyl)ethylenediamine (5.27 g., 0.017 equivalent) was heated at 150° C. and was thoroughly mixed with 0.19 g. benzyldimethylamine and 2.52 g. (0.017 mole) molten phthalic anhydride. The clear solution was heated at 150° C. and gelation occurred in 30 minutes. Curing was accomplished by heating for 2 hours at 150° C. and at 120° C. for 25 hours. The resulting resin was hard, slightly flexible and transparent.

EXAMPLE 31

*Preparation of N,N'-dioleoylpiperazine.*—A mixture of 200 grams (0.67 mole) of methyl oleate and 29 grams (0.33 mole) of anhydrous piperazine was heated until refluxing began and the methanol which formed was distilled off. The crude product was cooled to —20° C. and was filtered. The residue was recrystallized from ethanol to give a 30% yield of N,N'-dioleoylpiperazine M.P. 37.5–38.0° C. having an iodine number 81.8, 77.9% carbon, 12.2% hydrogen and 4.18% nitrogen (calculated values—82.7, 78.3, 12.0, 4.56 respectively).

EXAMPLE 32

*Preparation of N,N'-di-(cis-9,10-epoxystearoyl)piperazine.*—N,N'-dioleoylpiperazine was epoxidized by the method given in Example 28 to give a 93% yield of N,N'-di(cis-9,10-epoxystearoyl)piperazine M.P. 75–6° C., oxirane oxygen content 5.02% (calculated value 4.95).

EXAMPLE 33

*Curing of N,N'-di-(cis-9,10 - epoxystearoyl)piperazine with phthalic anhydride.*—A solution of 1.92 g. (0.013 mole) of phthalic anhydride and 0.15 g. benzyldimethylamine was heated at 150° C. and was thoroughly mixed with 4.12 g. (0.013 equivalent) of molten N,N'-di-(cis-9,10-epoxystearoyl)piperazine. The resulting solution gelled after 35 minutes of heating at 150° C. Cure was accomplished by heating at 150° C. for 2 hours and at 120° C. for 25 hours. The resulting resin was hard and slightly flexible.

Epoxy resins were also prepared using β-propiolactone (anhydride of 3-hydroxypropionic acid) as the cyclic anhydride and several types of compounds as the source of the epoxide groups. Preparation of these resins is illustrated in the following examples.

EXAMPLE 34

*Polymer from β-propiolactone and styrene oxide.*—A solution of 3.6 g. (0.05 mole) β-propiolactone, 6.0 g. (0.05 mole) styrene oxide and 0.2 cc. benzyldimethylamine was heated at 150° C. At the end of one hour, it became slightly viscous and at the end of four hours too viscous to flow readily. At the end of 7 hours of heating, the resulting polymer had an oxirane oxygen value of 0.48% which corresponds to a 96.5% conversion. The polymer was useful for surface coatings.

EXAMPLE 35

*Polymer from β-propiolactone and methyl epoxystearate.*—A solution of 1.8 g. (0.025 mole) propiolactone, 0.1 cc. benzyldimethylamine and 7.82 g. (0.025 mole) methyl epoxystearate was heated for 24 hours at 150° C. The oxirane oxygen content of the ensuing polymer was 0.66% which corresponds to an 84.3% conversion.

EXAMPLE 36

*Polymer from a commercial bisphenol-glycidyl ether resin intermediate and β-propiolactone.*—A solution of 5.4 g. (0.075 mole) of β-propiolactone and 10.6 g. of a commercially available glycidyl ether of bisphenol A having an epoxide equivalent of 142 was heated to 150° C. Within two hours, the solution had gelled and the resin was cured at 150° C. for 24 hours. A hard clear resin was formed which is useful for casting purposes. The use of a tertiary amine was not necessary in the preparation of this resin.

The following examples illustrate the procedure for preparing resins with tertiary amines other than benzyldimethylamine.

EXAMPLE 37

*Preparation of a resin from epoxidized soybean oil, phthalic anhydride and β-dimethylaminopropionitrile.*—A mixture of 5.4 g. (0.02 equivalent) of epoxidized soybean oil (5.9% oxirane) and 2.96 g. (0.02 mole) of phthalic anhydride was melted at 150° C. Three tenths cc. of β-dimethylaminopropionitrile (about 2.5% of the total weight of ingredients), was added and the components were thoroughly mixed. Gelation took place at 150° C. in 8 minutes. After the mixture had been cured for 8 hours at 150° C., a clear, hard resin was obtained.

EXAMPLE 38

*Preparation of a resin from epoxidized soybean oil, phthalic anhydride and triamylamine.*—The same mixture of epoxidized soybean oil and phthalic anhydride as that of Example 37 was treated with 0.3 cc. of triamylamine (about 2.5% of the total weight of ingredients) at 150° C. Gelation occurred in 8 minutes, and after the mixture had been cured for 8 hours at 150° C., a clear, hard resin was obtained.

We claim:

1. A process for the preparation of an epoxy resin comprising heating a mixture containing a compound having at least one non-terminal epoxide group, a cyclic anhydride selected from the group consisting of a cyclic carboxylic anhydride and a lactone, and a tertiary amine selected from the group consisting of benzyldimethylamine, β-dimethylaminopropionitrile, and triamylamine, to effect polymerization, each of said compound and said cyclic anhydride being present in said mixture in an amount ranging from an equimolar equivalent to ±20% of an equimolar equivalent, said tertiary amine being present in said mixture in about from 0.1 to 4% by weight.

2. The process of claim 1 wherein the cyclic anhydride is phthalic anhydride.

3. The process of claim 1 wherein the cyclic anhydride is β-propiolactone.

4. The process of claim 1 wherein the tertiary amine is benzyldimethylamine.

5. The process of claim 1 wherein the compound having at least one non-terminal epoxide group is an ester containing an epoxy derivative of an unsaturated fatty acid.

6. The process of claim 5 wherein the ester containing an epoxy derivative of an unsaturated fatty acid is an epoxidized vegetable oil.

7. The process of claim 5 wherein the ester containing an epoxy derivative of an unsaturated fatty acid is an epoxidized animal oil.

8. The process of claim 5 wherein the ester containing an epoxy derivative of an unsaturated fatty acid is an epoxidized oleate ester.

9. The process of claim 5 wherein the ester containing an epoxy derivative of an unsaturated fatty acid is an epoxidized linoleate ester.

10. The process of claim 1 wherein the compound having at least one non-terminal epoxide group is an amide containing an epoxy derivative of an unsaturated fatty acid.

11. The process of claim 10 wherein the amide is an epoxidized oleamide.

12. The process of claim 1 wherein the compound having at least one non-terminal epoxide group is cyclohexene oxide.

13. A compound selected from the group consisting of N,N' - di-(cis-9,10-epoxystearoyl)ethylenediamine, N,N'-dioleoylpiperazine, and N,N'-di-(cis-9,10-epoxystearoyl)piperazine.

14. N,N'-di - (cis-9,10-epoxystearoyl)ethylenediamine.

15. N,N'-dioleoylpiperazine.

16. N,N'-di-(cis-9,10-epoxystearoyl)piperazine.

References Cited in the file of this patent

UNITED STATES PATENTS

| | | |
|---|---|---|
| 2,761,870 | Payne et al. | Sept. 4, 1956 |
| 2,772,296 | Mueller | Nov. 27, 1956 |
| 2,870,170 | Payne et al. | Jan. 20, 1959 |
| 2,886,472 | Condo et al. | May 12, 1959 |
| 2,890,204 | Delmonte | June 9, 1959 |